(12) United States Patent
Henry et al.

(10) Patent No.: US 7,770,751 B2
(45) Date of Patent: Aug. 10, 2010

(54) BAKING TRAY

(75) Inventors: Lou Henry, Scarsdale, NY (US); Bruce Ancona, New York, NY (US)

(73) Assignee: Focus Products Group, LLC, Vernon Hills, IL (US)

( * ) Notice: Subject to any disclaimer, the term of this patent is extended or adjusted under 35 U.S.C. 154(b) by 116 days.

(21) Appl. No.: 12/136,641

(22) Filed: Jun. 10, 2008

(65) Prior Publication Data

US 2009/0302042 A1 Dec. 10, 2009

(51) Int. Cl.
*B65D 1/24* (2006.01)
*A47J 27/00* (2006.01)

(52) U.S. Cl. .................. 220/529; 220/507; 220/528; 220/573.1; 220/573.4

(58) Field of Classification Search .............. 220/573.1, 220/573.4, 625, 601, 610, 507, 528, 529; 99/426, 448; 248/146, 150, 153, 346.01
See application file for complete search history.

(56) References Cited

U.S. PATENT DOCUMENTS

| | | | |
|---|---|---|---|
| 410,682 A | 9/1889 | Berry | |
| 431,958 A | 7/1890 | Woulf | |
| 489,647 A | 1/1893 | Coe | |
| 578,012 A * | 3/1897 | Harris | ............... 4/285 |
| 602,730 A | 4/1898 | Cormeny | |
| 1,140,219 A | 5/1915 | Verstraete | |
| 1,173,210 A * | 2/1916 | Ochs | ............... 422/306 |
| 1,175,512 A | 3/1916 | Flemal | |
| 1,290,186 A | 1/1919 | Held | |
| 1,364,863 A | 1/1921 | Buchtel | |
| 1,446,767 A | 2/1923 | Price | |
| 1,485,852 A * | 3/1924 | Jarvis | ............... 108/92 |
| 1,531,569 A * | 3/1925 | Rade | ............... 249/102 |
| 1,567,234 A | 12/1925 | Brucker | |
| 1,697,902 A | 1/1929 | Burke | |
| 1,746,521 A | 2/1930 | Broeg | |
| 1,754,541 A | 4/1930 | Benoit | |
| 1,854,812 A | 4/1932 | Steinberg | |
| 2,118,211 A | 5/1938 | Lutz | |
| D132,314 S | 5/1942 | Melville | |
| 2,287,638 A | 6/1942 | Pereira et al. | |
| 2,338,007 A | 12/1943 | Morris | |
| 2,583,887 A * | 1/1952 | Schneeweiss | ............ 126/385.1 |
| 2,799,073 A | 7/1957 | Bergling et al. | |
| 3,161,158 A * | 12/1964 | Lurey | ............... 108/2 |
| 3,828,966 A | 8/1974 | Martin | |
| 4,000,845 A | 1/1977 | Zeller | |
| 4,184,421 A | 1/1980 | Ahlgren | |
| 4,195,402 A | 4/1980 | Leffer | |
| 4,773,320 A | 9/1988 | Stock et al. | |
| 5,074,777 A | 12/1991 | Garner | |
| 5,297,345 A | 3/1994 | Jaakola | |

(Continued)

*Primary Examiner*—Ehud Gartenberg
*Assistant Examiner*—Kareen Rush
(74) *Attorney, Agent, or Firm*—Michael Best & Friedrich LLP

(57) ABSTRACT

A baking tray includes an outer shell and a bottom plate positioned within the outer shell for supporting a food item. The bottom plate is removable from the outer shell to separate the food item from the outer shell. The baking tray also includes a divider assembly positionable within the outer shell adjacent to the bottom plate. The divider assembly is configured to divide the food item supported on the bottom plate into a plurality of pieces.

20 Claims, 7 Drawing Sheets

U.S. PATENT DOCUMENTS

| | | | | |
|---|---|---|---|---|
| 5,446,965 | A | 9/1995 | Makridis | |
| 5,537,917 | A | 7/1996 | Schiffer et al. | |
| 5,597,113 | A | 1/1997 | Bradford | |
| 5,720,397 | A * | 2/1998 | Thompson | 211/59.4 |
| 5,768,980 | A | 6/1998 | Degen | |
| 5,775,209 | A * | 7/1998 | Tiemann | 99/426 |
| 5,848,470 | A * | 12/1998 | Anderson | 30/277 |
| 6,065,393 | A | 5/2000 | Lombard et al. | |
| 6,135,014 | A * | 10/2000 | Chang | 99/339 |
| 6,276,918 | B1 * | 8/2001 | Slaughter et al. | 425/289 |
| 6,595,120 | B1 * | 7/2003 | Tiemann | 99/426 |
| 6,698,336 | B1 | 3/2004 | Siegel et al. | |
| 6,918,563 | B2 * | 7/2005 | Tseng | 248/146 |
| 7,107,983 | B1 * | 9/2006 | West | 126/25 R |
| D553,913 | S * | 10/2007 | Jackson | D7/587 |
| 7,480,999 | B2 * | 1/2009 | Atwater et al. | 30/289 |
| 2004/0020055 | A1 | 2/2004 | Zuker | |
| 2004/0200359 | A1 * | 10/2004 | Snider | 99/446 |
| 2004/0250667 | A1 | 12/2004 | Atwater | |
| 2005/0217498 | A1 * | 10/2005 | Miller et al. | 99/426 |
| 2006/0272162 | A1 * | 12/2006 | Atwater et al. | 30/303 |
| 2006/0272461 | A1 | 12/2006 | Atwater et al. | |
| 2006/0272466 | A1 | 12/2006 | Atwater et al. | |

* cited by examiner

BAKING TRAY

BACKGROUND

The present invention relates to baking trays.

Food items such as, for example, brownies, cakes, pies, desert bars, and bread loaves, are commonly baked in baking trays of various shapes, sizes, and depths. After baking, the food items are typically cut into a plurality of pieces or sections by hand with a knife. However, because the food items are cut by hand, the pieces may be unevenly shaped and sized. Furthermore, once the food items are cut, it is often difficult to remove the pieces, especially the first piece, from the baking trays.

SUMMARY

In one embodiment, a baking tray includes an outer shell and a bottom plate positioned within the outer shell for supporting a food item. The bottom plate is removable from the outer shell to separate the food item from the outer shell. The baking tray also includes a divider assembly positionable within the outer shell adjacent to the bottom plate. The divider assembly is configured to divide the food item supported on the bottom plate into a plurality of pieces as the food item is baked.

In another embodiment, a baking assembly includes an outer shell defining an opening and a bottom plate positioned within the outer shell over the opening for supporting a food item. The bottom plate is removable from the outer shell to separate the food item from the outer shell. The baking assembly also includes a stand positionable beneath the bottom plate. The stand includes a first portion sized to fit within the outer shell's opening to support the bottom plate apart from the outer shell.

In yet another embodiment, a method of baking a food item in a baking tray includes placing an uncooked food item such as batter or dough in the baking tray, positioning a divider assembly within an outer shell of the baking tray adjacent to a bottom plate to divide the uncooked food item into a plurality of segments, baking the uncooked food item in the baking tray to create a cooked food item, and removing the bottom plate from the outer shell to separate the segmented cooked food item from the outer shell.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

Figure 1:
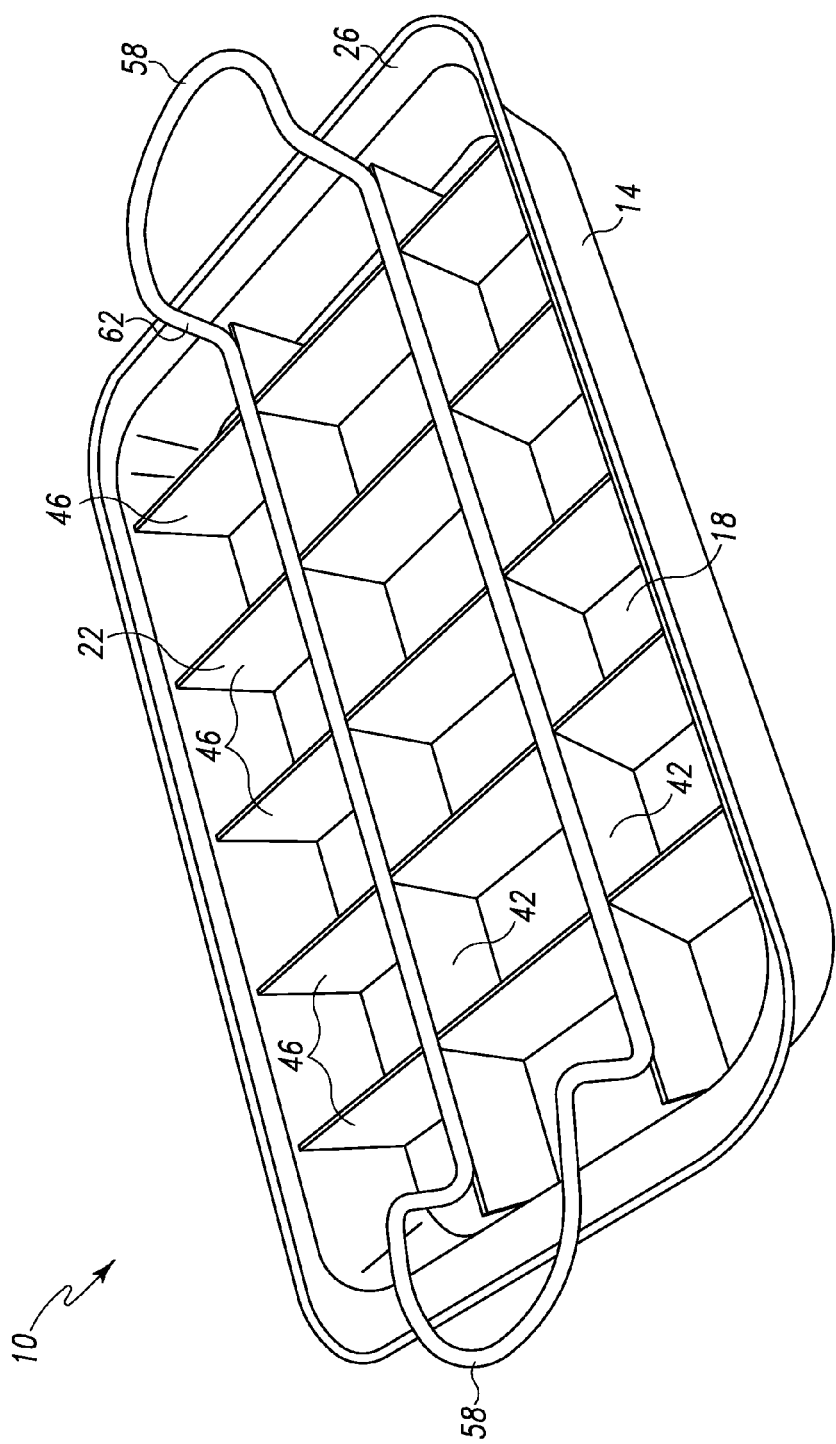
FIG. 1 is a perspective view of an embodiment of a baking tray.
Figure 2:
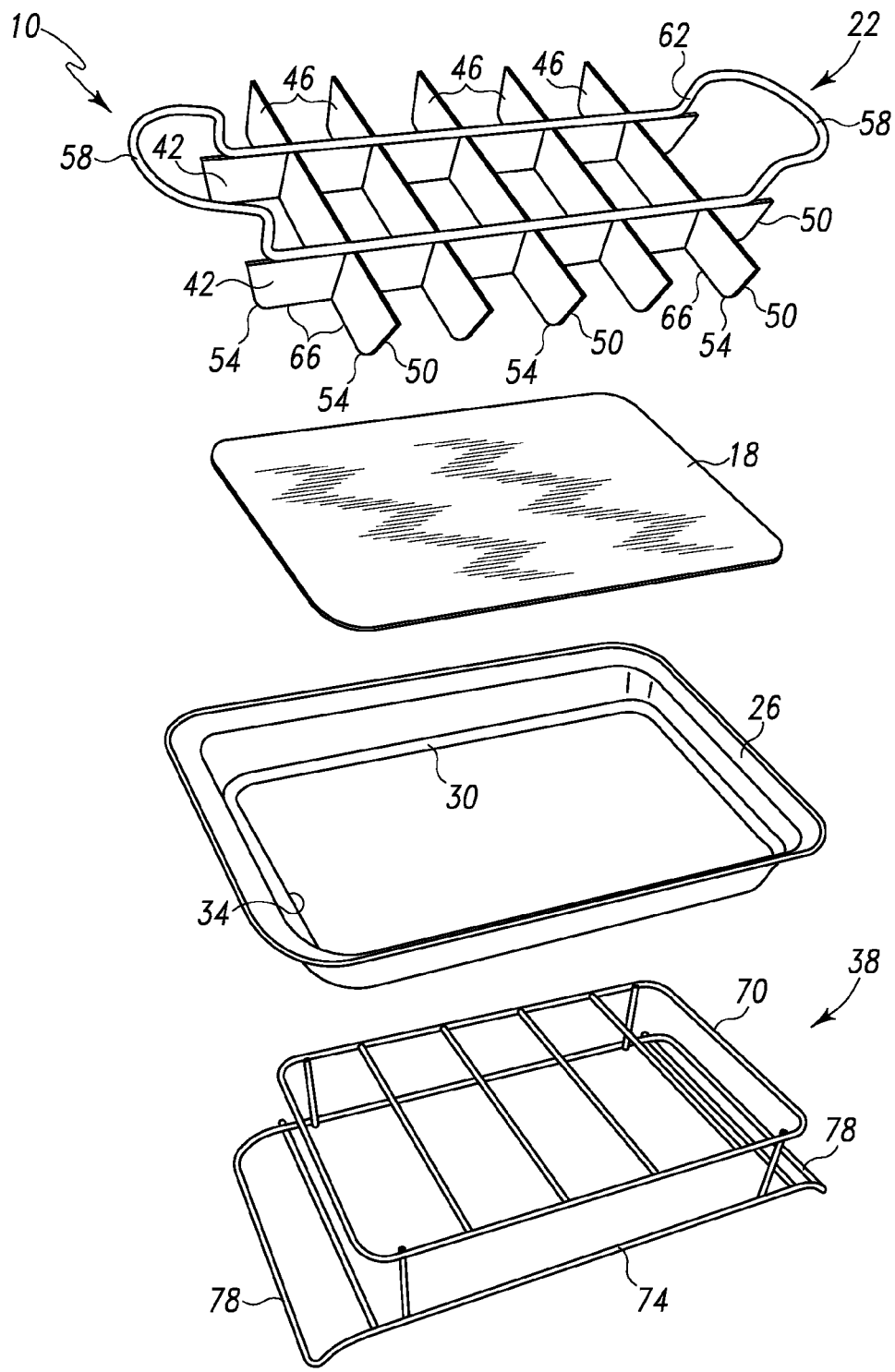
FIG. 2 is an exploded perspective view of the baking tray shown in FIG. 1.

FIGS. 1 and 2 illustrate a baking tray 10 for supporting and forming a food item during baking or cooking. In the illustrated embodiment, the baking tray 10 is a generally rectangular baking tray that supports, for example, brownies, sheet cakes, or the like. In other embodiments, the baking tray may be a square baking tray (FIG. 5) that supports desert bars, a circular baking tray (FIG. 6) that supports circular cakes or pies, or a loaf pan (FIG. 7) that supports loaves of bread. In still other embodiments, the baking tray 10 may be a more specialized baking tray, such as, for example, a lasagna pan, a casserole dish, an angel food or a Bundt cake pan, or the like.

The baking tray 10 includes an outer shell 14, a bottom plate 18 removably positioned within the outer shell 14, and a divider assembly 22 positioned within the outer shell 14 and engaging the bottom plate 18. In the illustrated embodiment, the baking tray 10 is composed of stainless steel and coated with a non-stick material such that the baking tray 10 is durable and suitable for use at high baking temperatures, yet also easy to clean. In other embodiments, the baking tray 10 may be composed of other materials suitable for baking.

The outer shell 14, or sidewall, includes an upper flange 26 extending outwardly from the shell 14 and a lower lip 30 extending inwardly from the shell 14. The flange 26 facilitates gripping and holding the baking tray 10, while the lip 30 removably supports the bottom plate 18. In some embodiments, the flange 26 may define enlarged handle portions to further facilitate handling of the baking tray 10. As shown in FIG. 2, the lip 30 defines a bottom opening 34 in the outer shell 14 such that a stand 38 (FIGS. 2 and 3) may extend partially through the opening 34 to separate and support the bottom plate 18 apart from the outer shell 14, as further described below.

The bottom plate 18 is a generally flat sheet that is shaped and sized to fit within the outer shell 14. When the bottom plate 18 is positioned within the outer shell 14, the bottom plate 18 covers the opening 34 such that the outer shell 14 and the bottom plate 18 resemble a standard baking tray for baking a food item. As shown in FIG. 1, a portion of the bottom plate 18 overlaps the lower lip 30 of the outer shell 14. The underside of the bottom plate 18 is thereby supported within the outer shell 14 by the lower lip 30 such that the bottom plate 18 can be freely separated from the outer shell 14 without having to first release any fastening means.

The illustrated divider assembly 22 includes two elongated dividers 42 extending along a length of the bottom plate 18 and five shorter dividers 46 extending across a width of the bottom plate 18 to divide a food item supported by the baking tray 10 into eighteen pieces or sections. In the illustrated embodiment, the elongated dividers 42 and the shorter dividers 46 are generally perpendicular to one another to divide the food item into generally rectangularly-shaped pieces. In other embodiments, the dividers 42, 46 may be oriented in other positions relative to one another to divide the food item into pieces having different shapes. Additionally or alternatively, the divider assembly 22 may include fewer or more elongated dividers 42 and/or shorter dividers 46 to divide the food item into different numbers and/or different sizes of pieces or sections. As shown in FIG. 2, a side edge 50 of each divider 42, 46 is slightly tapered and a bottom corner 54 of each divider 42, 46 is rounded to substantially conform to, and thereby fit within, the outer shell 14.

The divider assembly 22 also includes two handles 58 extending upwardly and outwardly from the dividers 42, 46. The handles 58 facilitate gripping of the divider assembly 22 such that a user may insert and remove the divider assembly 22 into and from the outer shell 14 without having to grasp the dividers 42, 46. In the illustrated embodiment, the handles 58 are formed from a single rod 62 that is bent into a continuous loop to define the two handles 58. The rod 62 is coupled to the dividers 42, 46 by, for example, welding, brazing, or the like. In other embodiments, other suitable handles may be coupled to the dividers 42, 46 to facilitate gripping of the divider assembly 22.

As shown in FIG. 1, the divider assembly 22 is positioned within the outer shell 14 adjacent to the bottom plate 18 to divide an uncooked food item (e.g., batter, dough, or the like) into a plurality of pieces or sections. A bottom edge 66 (FIG. 2) of each divider 42, 46 extends adjacent to the bottom plate 18 to separate the food item into distinct sections. In some embodiments, the dividers 42, 46 may be spaced slightly apart from the bottom plate 18 when the divider assembly 22 is positioned within the outer shell 14 such that the uncooked food item may flow underneath the bottom edges 66 of the dividers 42, 46 between the sections. The cooked food item may then be easily separated into individual pieces or sections once baking is complete.

After the uncooked food item is positioned on the baking tray 10 and separated by the divider assembly 22, the baking tray 10 is placed in an oven to cook or bake the uncooked food item. After the food item is done baking and has sufficiently cooled, a user grabs the handles 58 of the divider assembly 22 to lift the divider assembly 22 away from the bottom plate 18 and the outer shell 14, leaving a cooked food item that is separated into a plurality of pieces within the baking tray 10. In some embodiments, the bottom edge 66 of each divider 42, 46 may be sharpened to facilitate dividing the uncooked food item into the plurality of pieces or to cut the food item into the plurality of pieces after baking.

Figure 3:
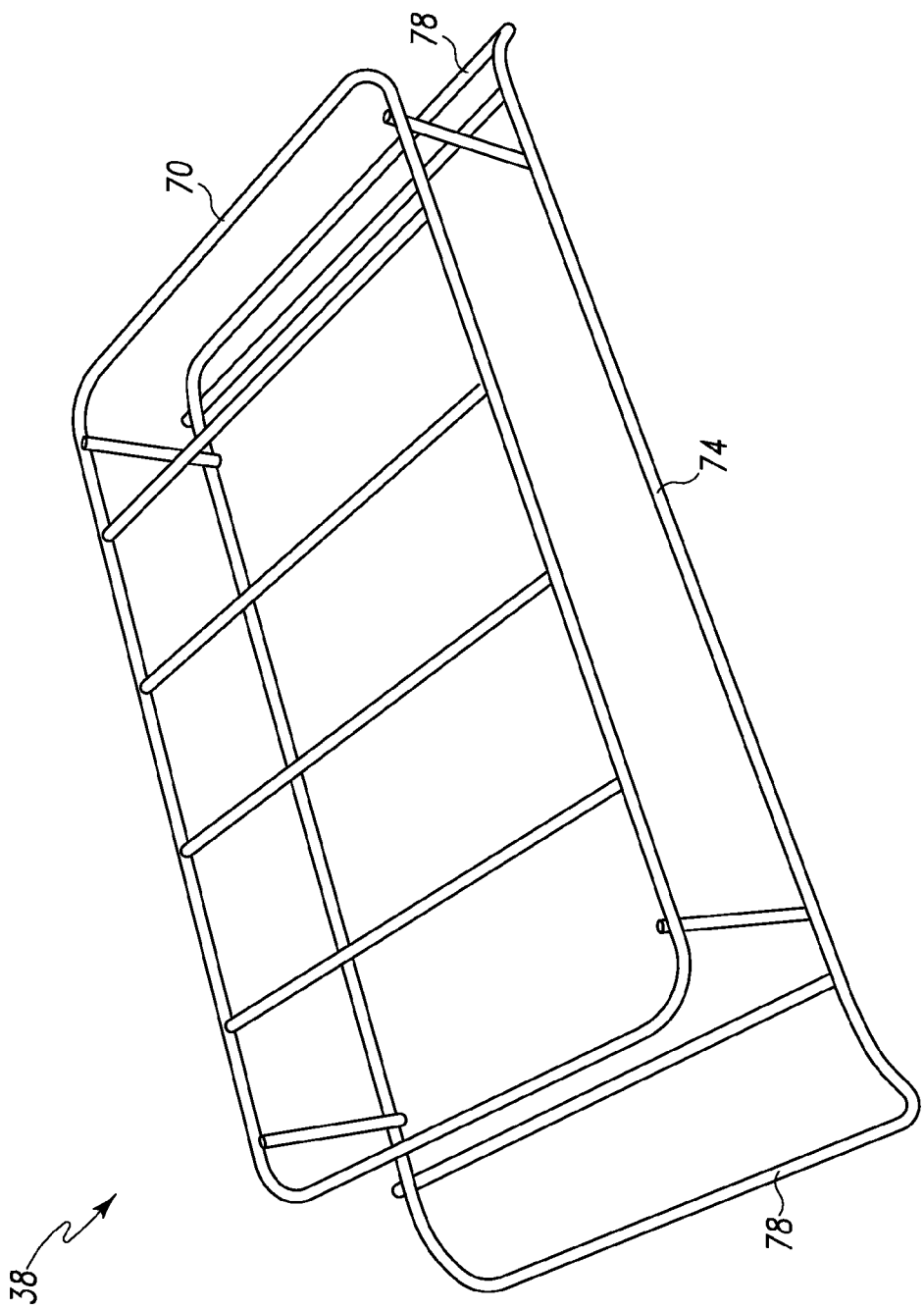
FIG. 3 is a perspective view of a stand for use with the baking tray shown in FIG. 1.

FIG. 3 illustrates the stand 38, or rack, for use with the baking tray 10. The illustrated stand 38 is a wire stand including an upper portion 70 and a lower portion 74. In the illustrated embodiment, the upper portion 70 of the stand 38 is shaped and sized to fit within the opening 34 (FIG. 2) in the outer shell 14 to engage and separate the bottom plate 18 from the outer shell 14. The lower portion 74 of the stand 38 is slightly longer than the outer shell 14 and defines leg portions 78 to support the stand 38 on a support surface (e.g., a countertop, a tabletop, or the like). The stand 38 thereby supports the separated outer shell 14 below the bottom plate 18 but above the support surface. In some embodiments, the stand 38 may be collapsible to facilitate storage of the stand 38 when not in use.

Figure 4:
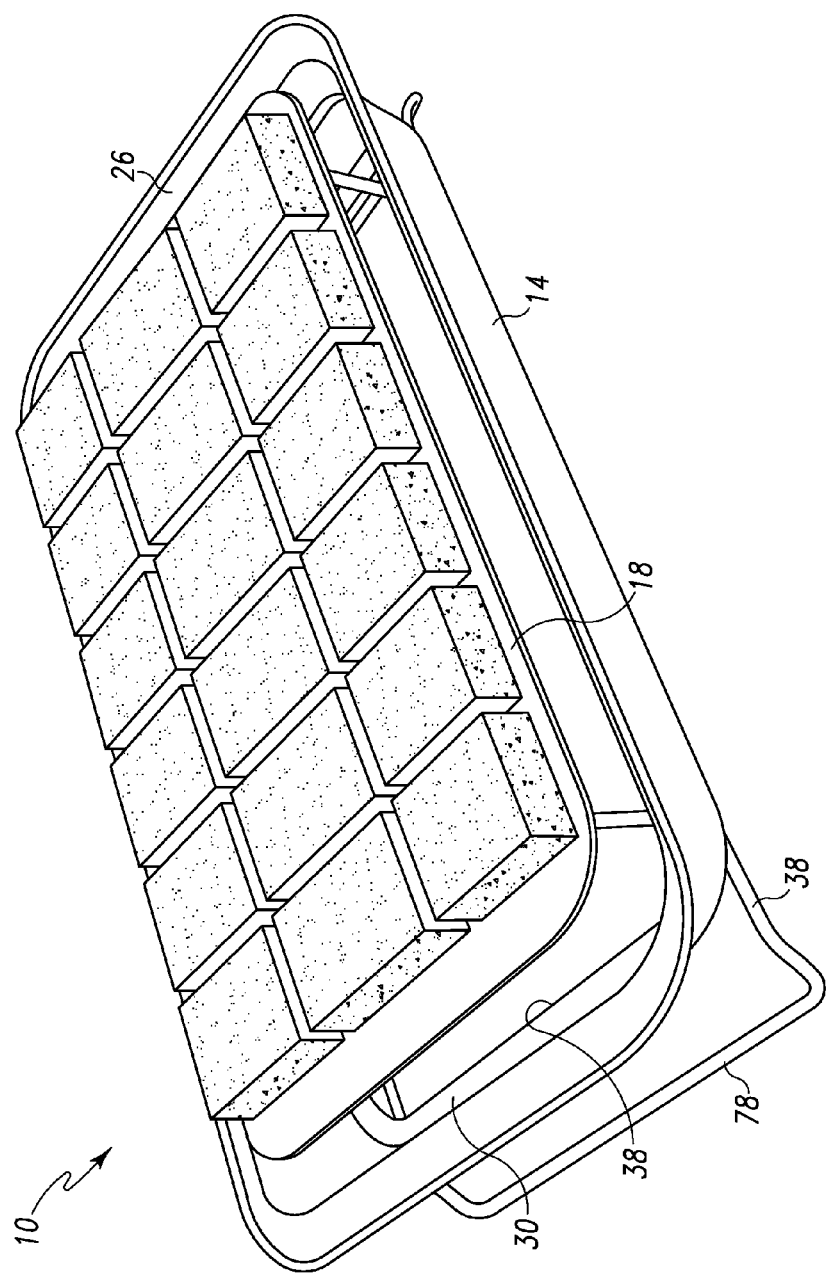
FIG. 4 is a perspective view of the baking tray shown in FIG. 1 supported on the stand shown in FIG. 3.

As shown in FIG. 4, the baking tray 10 is positionable on the stand 38 such that the upper portion 70 extends through the opening 34 (FIG. 2) in the outer shell 14 to separate the bottom plate 18, and thereby the food item, from the outer shell 14. In the illustrated embodiment, the upper portion 70 of the stand 38 lifts the bottom plate 18 to support the plate in a position above the upper flange 26 of the outer shell 14. In other embodiments, the upper portion 70 may lift the bottom plate 18 to a position higher or lower relative to the upper flange 26. As can be seen in FIG. 4, the outer shell 14 slides downward relative to the bottom plate 18 to rest on the lower portion 74 of the stand 38 such that, if the baking tray 10 is still warm, the outer shell 14 does not burn or otherwise damage the surface supporting the stand 38 and the baking tray 10. The wire stand 38 also facilitates cooling of the baking tray 10 and the food item when the baking tray 10 is supported on the stand 38.

Once the bottom plate 18 is lifted and supported apart from the outer shell 14 of the baking tray 10, the food item may be easily accessed and served by a user. The outer shell 14 is positioned out of the way of the food item such that the user can scoop or remove the food item from the bottom plate 18 without interference from the outer shell 14. In addition, since the divider assembly 22 divides the food item before baking, the user generally does not need to cut the food item into individual pieces or sections by hand.

Figure 5:
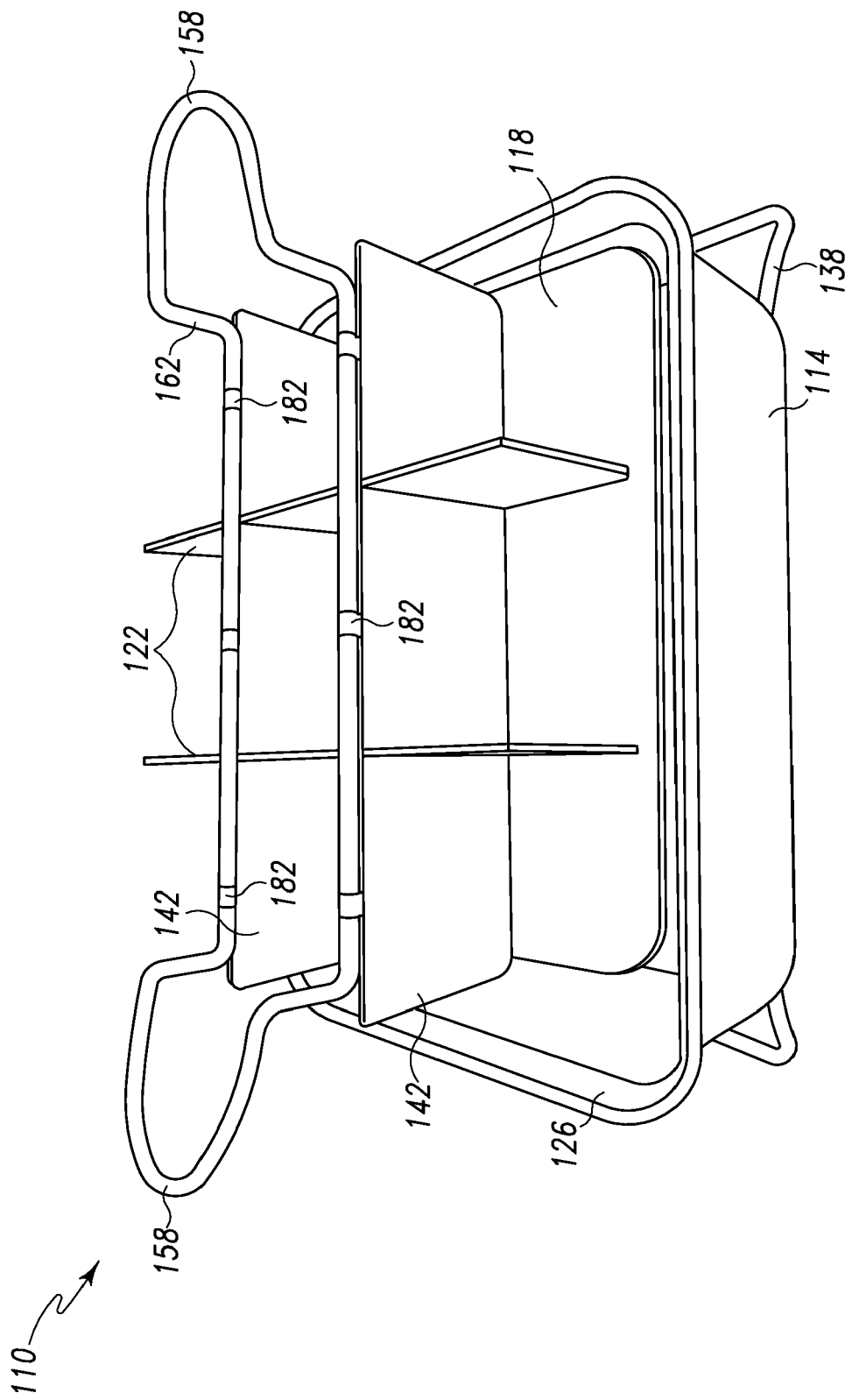
FIG. 5 is a perspective view of a generally square baking tray supported on a stand.

FIG. 5 illustrates another embodiment of a baking tray 110 and a stand 138. The illustrated baking tray 110 and stand 138 are similar to the baking tray 10 and the stand 38 shown in FIGS. 1-4, and like parts have been given the same reference numbers plus 100. Reference is hereby made to the description of the baking tray 10 and stand 38 above for features and alternatives to the baking tray 110 and the stand 138 not specifically discussed herein.

The illustrated baking tray 110 is a generally square baking tray including an outer shell 114 that is deeper relative to the outer shell 14 shown in FIGS. 1 and 2. The square baking tray 110 is used to support, for example, brownies or desert bars during baking.

Similar to the baking tray 10 of FIGS. 1 and 2, the square baking tray 110 includes a divider assembly 122 having two first dividers 142 extending in a first direction and two second dividers 146 extending in a second direction to divide a food item into nine pieces. In the illustrated embodiment, the first and second directions are substantially perpendicular to one another such that the divider assembly 122 divides the food item into generally square-shaped pieces.

The divider assembly 122 also includes two handles 158 coupled to the dividers 142, 146. Similar to the handles shown in FIGS. 1 and 2, a single rod 162 is bent to define the two handles 158. However, in the illustrated embodiment, the first dividers 142 include loops 182 that wrap around a portion of the rod 162 to couple the rod 162 to the dividers 142.

Similar to the stand of FIG. 3, the stand 138 of FIG. 5 is shaped and sized to fit within an opening defined by the outer shell 114 to lift and support a bottom plate 118 of the square baking tray 110 apart from the outer shell 114.

Figure 6:
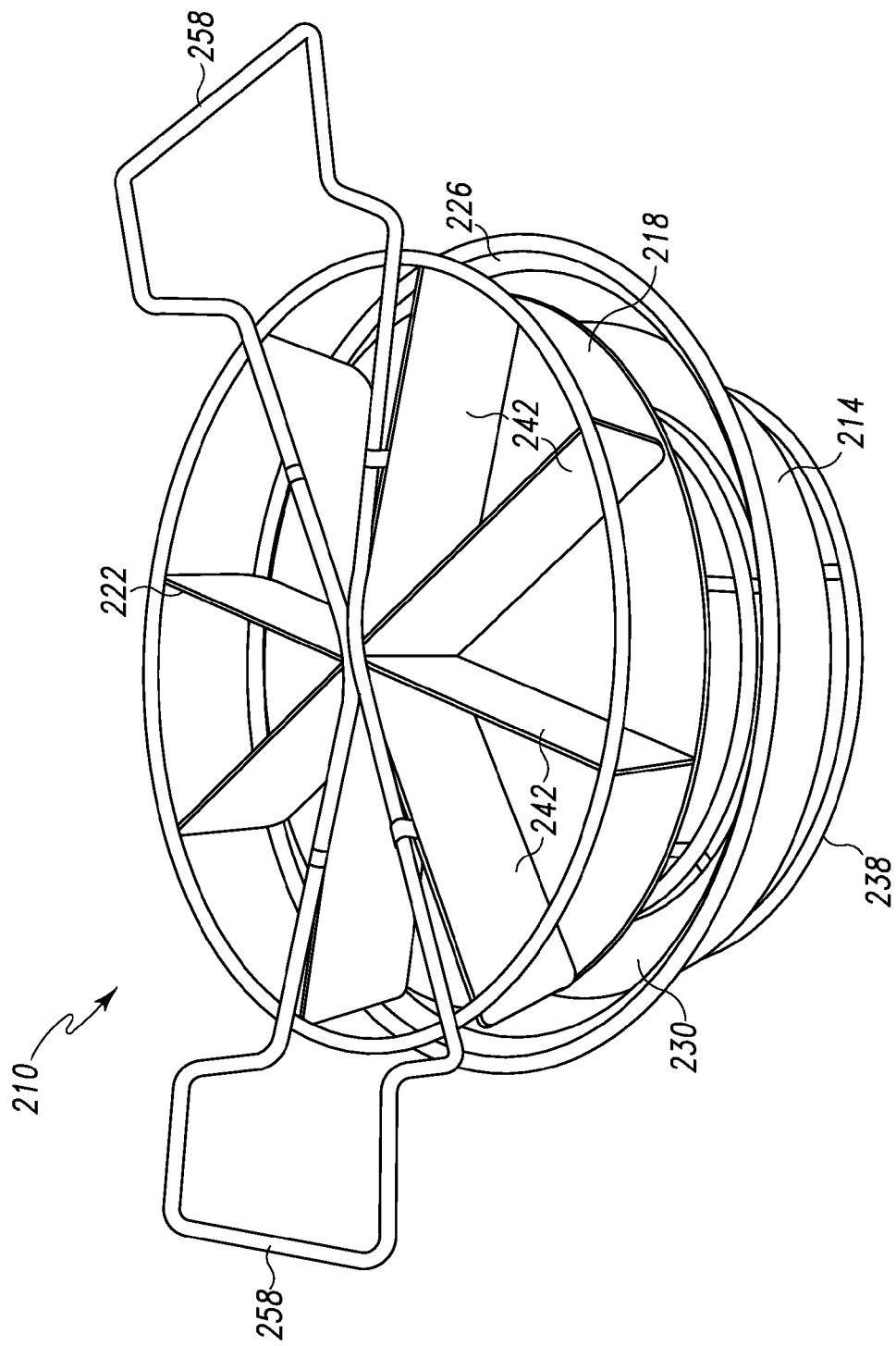
FIG. 6 is a perspective view of a generally round baking tray supported on a stand.

FIG. 6 illustrates yet another embodiment of a baking tray 210 and a stand 238. The illustrated baking tray 210 and stand 238 are similar to the baking trays 10, 110 and the stands 38, 138 shown in FIGS. 1-5, and like parts have been given the same reference numbers plus 200. Reference is hereby made to the description of the baking trays 10, 110 and stands 38, 138 above for features and alternatives to the baking tray 210 and the stand 238 not specifically discussed herein.

The illustrated baking tray 210 is a generally round baking tray suitable for supporting, for example, round cakes during baking. In some embodiments, an outer shell 214 of the baking tray 210 may be sloped inwardly from an upper flange 226 to a lower lip 230 such that the round baking tray 210 is suitable for supporting pies.

In the illustrated embodiment, the baking tray 210 includes a divider assembly 222 having four dividers 242 extending radially across diameters of the baking tray 210. The dividers 242 are generally equally spaced about the baking tray 210 such that the divider assembly 222 divides a food item supported by the baking tray 210 into eight generally wedge-shaped pieces of similar size. In other embodiments, the divider assembly 222 may include fewer or more dividers 242 to divide the food item into fewer or more pieces.

Similar to the stands of FIGS. 3 and 5, the illustrated stand 210 is shaped and sized to fit within an opening defined by the outer shell 214 to lift and support a bottom plate 218 of the round baking tray 210 apart from the outer shell 214.

Figure 7:
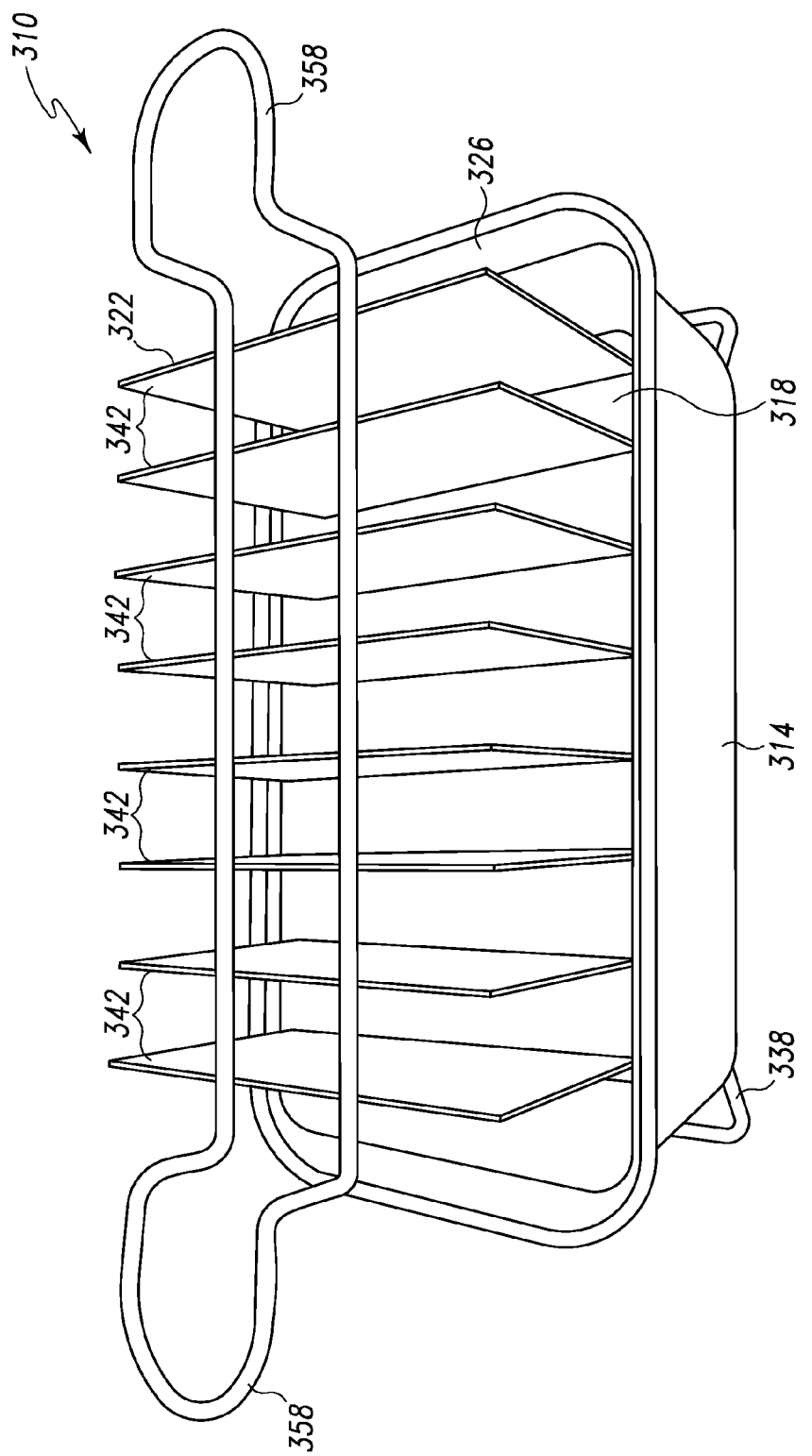
FIG. 7 is a perspective view of a loaf pan supported on a stand.

FIG. 7 illustrates still another embodiment of a baking tray 310 and a stand 338. The illustrated baking tray 310 and stand 338 are similar to the baking trays 10, 110, 210 and the stands 38, 138, 238 shown in FIGS. 1-6, and like parts have been given the same reference numbers plus 300. Reference is hereby made to the description of the baking trays 10, 110, 210 and stands 38, 138, 238 above for features and alternatives to the baking tray 310 and the stand 338 not specifically discussed herein.

The illustrated baking tray 310 is a loaf pan including a relatively deep outer shell 314. The baking tray 310 is used to support, for example, bread or meat loaves during baking.

In the illustrated embodiment, the loaf pan 310 includes a divider assembly 322 having eight dividers 342 arranged substantially in parallel to divide a loaf into nine slices. In other embodiments, the divider assembly 322 may include fewer or more dividers 342 to divide the loaf into fewer or more slices.

Similar to the stands 38, 138, 238 of FIGS. 3, 5, and 6, the illustrated stand 338 is shaped and sized to fit within an opening defined by the outer shell 314 to lift and support a bottom plate 318 of the loaf pan 310 apart from the outer shell 314.

Various features and advantages of the invention are set forth in the following claims.

What is claimed is:

1. A baking tray comprising:
an outer shell;
a bottom plate positioned within the outer shell for supporting a food item, the bottom plate being removable from the outer shell to separate the food item from the outer shell;
a divider assembly positionable within the outer shell adjacent to the bottom plate, the divider assembly configured to divide the food item supported on the bottom plate into a plurality of pieces; and
a stand positionable beneath the bottom plate and including a first portion having a periphery sized to fit within and extend through an opening in the outer shell to support the bottom plate apart from the outer shell, and a second portion positioned lower than the first portion relative to a support surface such that ventilation is provided below the first portion and within the periphery via an open space in the stand.

2. The baking tray of claim 1, wherein the outer shell includes a lower lip, and wherein the bottom plate is supported by the lower lip when positioned within the outer shell.

3. The baking tray of claim 1, wherein the divider assembly includes a handle to facilitate positioning the divider assembly within the outer shell.

4. The baking tray of claim 1, wherein the divider assembly is configured to divide the food item into a plurality of generally rectangular-shaped pieces.

5. The baking tray of claim 1, wherein the divider assembly is configured to divide the food item into a plurality of generally wedge-shaped pieces.

6. The baking tray of claim 1, wherein the second portion supports the outer shell above the support surface.

7. The baking tray of claim 6, wherein the stand supports the bottom plate above the outer shell.

8. A baking assembly comprising:
an outer shell defining an opening;
a bottom plate positioned within the outer shell and overlying the opening for supporting a food item, the bottom plate being removable from the outer shell to separate the food item from the outer shell; and
a wire stand positionable beneath the bottom plate, the stand including a first portion sized to fit within the opening to support the bottom plate apart from the outer shell.

9. The baking assembly of claim 8, wherein the outer shell includes a lower lip defining the opening, and wherein the bottom plate is supported by the lower lip when positioned within the outer shell.

10. The baking assembly of claim 8, wherein the stand includes a second portion to support the outer shell when the first portion of the stand supports the bottom plate apart from the outer shell.

11. The baking assembly of claim 10, wherein the second portion is positioned lower than the first portion relative to a support surface, and wherein the second portion supports the outer shell between the support surface and the bottom plate.

12. The baking assembly of claim 8, further comprising a divider assembly positionable within the outer shell adjacent to the bottom plate, wherein the divider assembly is configured to divide the food item supported on the bottom plate into a plurality of pieces.

13. The baking assembly of claim 12, wherein the divider assembly includes a handle to facilitate positioning of the divider assembly within the outer shell.

14. The baking assembly of claim 12, wherein the divider assembly is configured to divide the food item into a plurality of generally rectangular-shaped pieces.

15. The baking assembly of claim 12, wherein the divider assembly is configured to divide the food item into a plurality of generally wedge-shaped pieces.

16. The baking assembly of claim 1, wherein the stand is a wire stand.

17. A baking assembly comprising:
an outer shell defining an opening;
a bottom plate positioned within the outer shell and overlying the opening for supporting a food item, the bottom plate being removable from the outer shell to separate the food item from the outer shell; and
a stand positionable beneath the bottom plate, the stand including a first portion having a periphery sized to fit within the opening to support the bottom plate apart from the outer shell, and a second portion positioned lower than the first portion relative to a support surface such that ventilation is provided from below the second portion up to and within the periphery of the first portion via an open space in the stand.

18. The baking assembly of claim 17, wherein the outer shell defines an outermost periphery and the stand defines an outermost periphery, the outermost periphery of the stand being larger than the outermost periphery of the outer shell.

19. The baking assembly of claim 17, wherein the first portion of the stand supports the bottom plate substantially about a periphery of the bottom plate.

20. The baking assembly of claim 17, wherein the stand is a wire stand.

* * * * *